United States Patent [19]
Narad et al.

[11] Patent Number: 5,692,197
[45] Date of Patent: Nov. 25, 1997

[54] METHOD AND APPARATUS FOR REDUCING POWER CONSUMPTION IN A COMPUTER NETWORK WITHOUT SACRIFICING PERFORMANCE

[75] Inventors: Charles E. Narad, Santa Clara; Zahir Ebrahim, Mountain View; Satyanarayana Nishtala, Cupertino; William C. Van Loo, Palo Alto; Kevin B. Normoyle; Louis F. Coffin, III, both of San Jose; Leslie Kohn, Fremont, all of Calif.

[73] Assignee: Sun Microsystems, Inc., Mountain View, Calif.

[21] Appl. No.: 414,879

[22] Filed: Mar. 31, 1995

[51] Int. Cl.$^6$ .................................... G06F 1/32
[52] U.S. Cl. ............................. 395/750; 364/707
[58] Field of Search ................... 395/750, 182.21, 395/182.22, 733–742; 364/707

[56] References Cited

U.S. PATENT DOCUMENTS

| | | |
|---|---|---|
| 4,980,836 | 12/1990 | Carter et al. |
| 5,148,380 | 9/1992 | Lin et al. ............................ 364/707 |
| 5,283,905 | 2/1994 | Saadeh et al. .................... 395/750 |
| 5,287,537 | 2/1994 | Newmark et al. ................ 395/800 |
| 5,303,171 | 4/1994 | Belt et al. .......................... 364/707 |
| 5,432,946 | 7/1995 | Allard et al. ...................... 395/750 |
| 5,467,469 | 11/1995 | Saito et al. ....................... 395/182.12 |
| 5,497,494 | 3/1996 | Combs et al. ..................... 395/750 |

Primary Examiner—Jack B. Harvey
Assistant Examiner—Sumati Lefkowitz
Attorney, Agent, or Firm—Gary S. Williams; Flehr Hohbach Test Albritton & Herbert LLP

[57] ABSTRACT

A method and apparatus for actively managing the overall power consumption of a computer network which includes a plurality of computer systems interconnected to each other. In turn, each computer system has one or more modules. Each computer system of the computer network is capable of independently initiating a transition into a power-conserving mode, i.e., a "sleep" state, while keeping its network interface "alive" and fully operational. Subsequently, each computer system can independently transition back into fully operational state, i.e., an "awake" state, when triggered by either a deterministic or an asynchronous event. As a result, the sleep states of the computer systems are transparent to the computer network. Deterministic events are events triggered internally by a computer system, e.g., an internal timer waking the computer system up at midnight to perform housekeeping chores such as daily tape backups. Conversely, the source of asynchronous events are external in nature and include input/output (I/O) activity. The illusion of the entire network being always fully operational is possible because the system controllers, the interconnects and network interfaces of each computer system remain fully operational while selected modules and peripheral devices are powered down. As a result, each computer system is able to rapidly awake from sleep state in response to stimuli by powering down selected modules thereby accomplishing power conservation without requiring a static shut down of the computer network, i.e., without the overall performance and response of the computer network.

17 Claims, 11 Drawing Sheets

METHOD AND APPARATUS FOR REDUCING POWER CONSUMPTION IN A COMPUTER NETWORK WITHOUT SACRIFICING PERFORMANCE

BACKGROUND OF THE INVENTION

1. Field of the Invention

This invention relates to the field of power management. More particularly, the present invention relates to conserving overall power in a computer network having a number of computer systems.

2. Description of the Related Art

With the advent of computer systems with high clock speeds and power hungry peripherals such as hard disk drives, reducing the overall power consumption of a computer network which include a large number of computer systems becomes increasingly important as the number of computer systems in the computer network increases and as the capability of each of the computer systems increase.

Conventional power conservation techniques for computer systems include powering down peripheral input/output (I/O) devices such as disk drives and stopping processor clocks. For example, when an inactivity interval timer senses the absence of key strokes on a keyboard within a predetermined time, a signal is sent to the disk drive controller to enter a power saving mode, e.g., to power down the drive motor. In addition, the system clock coupled to the processor may be stopped. Subsequently, a user restarts the computer system by depressing a switch which causes the disk drive controller to power up the drive motor and restarts the system clock.

U.S. Pat. No. 4,980,836, issued to Carter et al. discloses a battery-powered portable computer in which a power control logic circuit continuously monitors selected peripheral devices such as the keyboard, and in the absence of activity from the selected peripheral devices within a predetermined interval, stops the system clock and/or turns peripheral devices such as modems and disk drives off. Subsequently, the user depresses a standby switch which signals the power control logic circuit to restore power to the modem and disk drive, and also restarts the system clock.

Disadvantages of the conventional power conservation methods described above include the need for user intervention to reawaken or restart the computer system, and the inability of the computer system to process any incoming data while it is in the power saving mode, i.e. sleeping. For example, the Carter computer is unable to automatically power up and establish a network connection when a network packet arrives at its network interface, i.e., the modem, because power to the modem is disconnected when the computer system is in the power saving mode. As a result, when the Carter computer is powered-down, it also appears to be sleeping with respect to its network interface until it is awaken by the user, e.g., by depressing the keyboard.

Hence there is a need for a transparent method of reducing the overall power consumption of a computer network which has multiple computer systems coupled together, such that when one or more processors of the computer systems in the network enter a sleep mode, the entire computer network remains operational, and every processor, including sleeping processors, appears to be continuously awake and ready to respond to I/O activity, for example to receive an ethernet packet from another computer system in the computer network.

SUMMARY OF THE INVENTION

The present invention provides a method and apparatus for actively managing the overall power consumption of a computer network which includes a plurality of computer systems interconnected to each other. Each computer system has one or more processor modules and one or more I/O interface modules. Suitable interconnect(s) for coupling the modules of each computer system include packet-switched interconnects and circuit-switched system buses. Suitable network connections for coupling the computer systems of the network include high speed cluster connections, local area network (LAN) such as ethernet, and wide area network (WAN) such as asynchronous transfer mode (ATM).

In accordance with the invention, each computer system of the computer network is capable of independently initiating a transition into a power-conserving mode, i.e., a "sleep" state, while keeping the respective network interface "alive" and fully operational. Subsequently, each computer system can independently transition back into a fully operational state, i.e., an "awake" state, when triggered by either a deterministic or an asynchronous event. As a result, the sleep states of the computer systems are transparent to the computer network.

Deterministic events are events triggered internally by a computer system, e.g., an internal timer waking the computer system up at midnight to perform housekeeping chores such as daily tape backups. Conversely, the source of asynchronous events are external in nature. Examples of asynchronous events include input/output (I/O) activity causing a keyboard interrupt from a keyboard controller, and the arrival of a data packet arriving at a network interface controller of the computer system.

In one embodiment, the computer systems are packet-switched and the interconnects of the computer systems are cross-bar switches. Crossed reference co-pending patent application, entitled "Packet Switched Cache Coherent Multiprocessor System", U.S. patent application Ser. No. 08/415,175, filed Mar. 31, 1995, assigned to Sun Microsystems, Inc. provides a detailed description of a patch switch and related packet switching protocol. A system controller (SC) provides control signals for directing the flow of packets through the interconnect in each computer system. Alternatively, the control mechanism provided by the SC can be distributed, i.e., with the functionality of the SC distributed among several processor modules. System controllers remains awake while one or more of their respective modules are powered down.

Upon entering the sleep state, the computer system sets the appropriate status/semaphore bits corresponding to its processor module(s). Important data of the processor module(s) including kernel state information is stored in a stable memory. Any cache memory of the processor module(s) is flushed into a main memory of the computer system. Finally, the processor module(s) of the computer system are powered down. Semaphore bits inhibit power up of processor module(s) when the processor module(s) are executing critical code while in the process of being powered down.

As discussed above, the computer system is awaken by either a deterministic or an asynchronous event, the SC receive a wakeup interrupt request which causes the SC to send a reset signal to powered-down modules. Upon receiving the reset signal, the powered-down modules execute a power-up sequence. Next, the processor module(s) poll a SC status bit to determine the cause of the reset signal. Previously stored important data is restored if the cause of the reset signal is a wakeup interrupt for the computer system as opposed to a system-wide power-on reset. Finally, the status/semaphore bits are cleared to indicate that the processor module(s) of the computer system are now powered-up. The computer system is now able to service the cause of the event.

3

The power conservation of the computer network results from the ability of each computer system to appear to be continuously awake while actually sleeping, thereby contributing to an illusion that the entire computer network is continuously "alive" when in fact one or more of its computer systems may be in the sleep state. This illusion is possible because the system controllers, the interconnects and network interfaces of each modules remain fully operational while the processor modules and peripheral devices are powered down. Hence the powered down state of each processor module is transparent to the other computer systems of the computer network.

As a result, the power management of the present invention advantageously enables the computer system to rapidly wake up from the sleep state in response to stimuli by powering down selected modules thereby accomplishing power conservation without requiring a static shutdown of the computer network, i.e., without affecting the overall performance and response of the computer network.

DESCRIPTION OF THE DRAWINGS

The objects, features and advantages of the system of the present invention will be apparent from the following description in which.

NOTATIONS AND NOMENCLATURE

Asynchronous event: an event triggered externally with respect to the computer system.

Deterministic event: events triggered by the computer system, e.g., the expiration of an internal timer.

Sleep state: a state of the computer system where one or more of its modules are powered down.

Awake state: a state of the computer system whereby all its modules are powered-up.

Wakeup sequence: a sequence executed by the computer system to transition from the sleep state into the awake state.

Power-up sequence: a sequence executed by a module to transition from a powered-down state into a powered-up state.

Power-down sequence: a sequence executed by a module to transition from a powered-up state into a powered-down state.

4

$I/O_{13}$ Wakeup_Enable bit: a control bit in an I/O interface module for inhibiting DMA requests from an I/O bus coupled to the I/O interface module. This bit causes the I/O interface module to issue an interrupt request (Int_Req) for a system controller. The system controller then wakes up the computer system by sending a reset signal to any powered-down module(s).

S_Sleep_Enter and S_Wakeup_Enable semaphore bits: the S_Sleep_Enter semaphore bit of the system controller provides an indicator that the computer system is in the process of entering the sleep state, and inhibits power up of the processor module(s) until the corresponding S_Wakeup_Enable semaphore bit is set. The setting of the S_Wakeup_Enable bit indicates that the processor module (s) of the computer system has completed the power-down sequence and it is now safe to initiate a power up of the processor module(s).

Wakeup_Reset bit: a status bit of the system controller for indicating that the cause of reset signal is a wakeup of the computer system, as opposed to a system-wide power on reset.

DESCRIPTION OF THE PREFERRED EMBODIMENT

In the following description, numerous details provide a thorough understanding of the invention. These details include functional blocks and an exemplary computer network to assist a designer in implementing an efficient active power management scheme for the computer network which permits the "sleep" state of the computer system(s) to be transparent to the rest of the computer network. While the power management scheme is illustrated by a specific implementation, the invention is applicable to a wide variety of network architectures and environments. In other instances, well-known circuits, structures and program code are not described in detail so as not to obscure the invention unnecessarily. Accordingly, references to co-pending applications are included to provide implementational details which are not essential for illustrating the principles of the present invention.

Figure 1A:
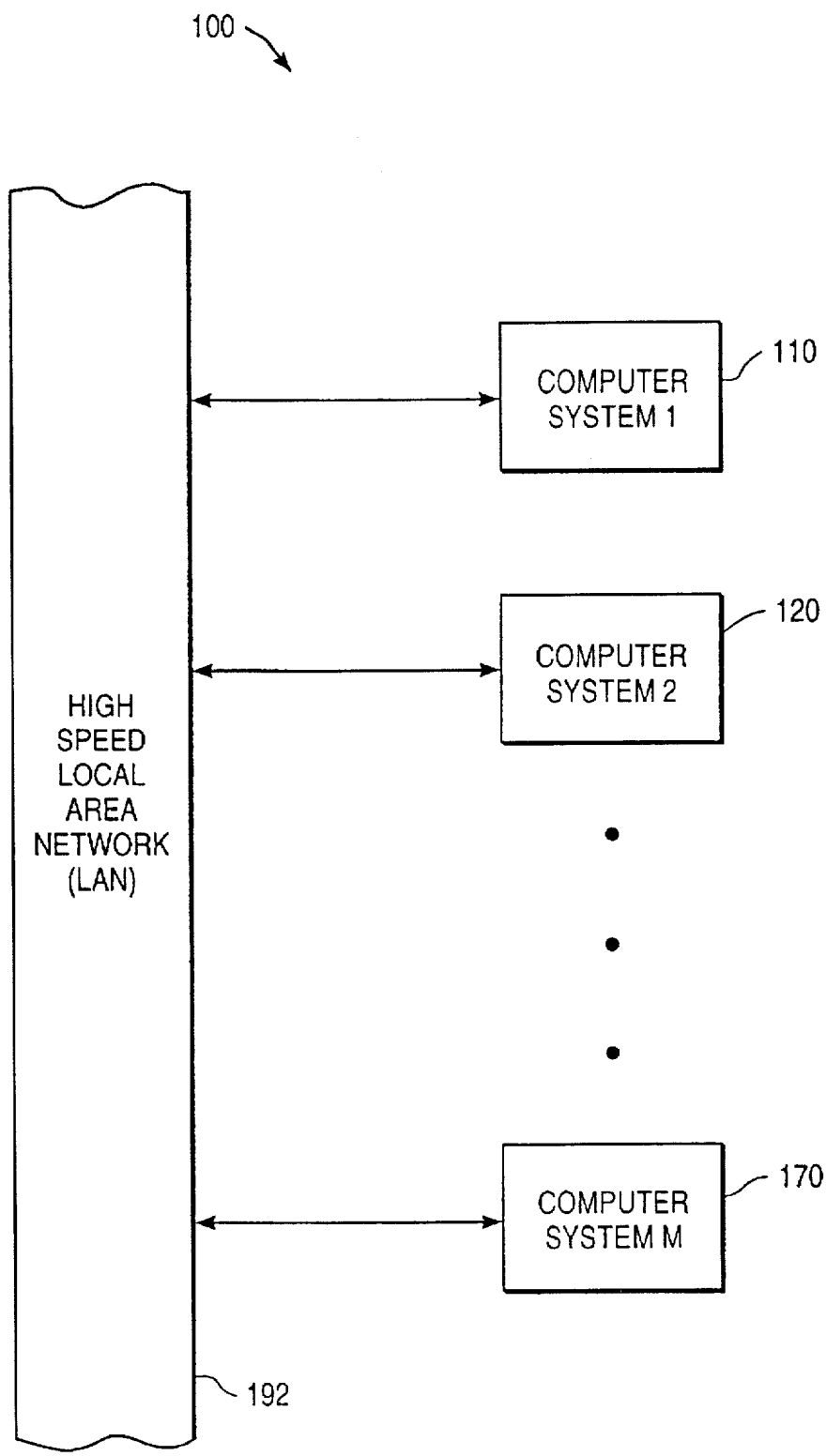
FIG. 1A is a block diagram showing a computer network including multiple computer systems coupled to each other for implementing the power management scheme of the present invention.

In accordance with one embodiment of the present invention, as illustrated by the block diagram of FIG. 1A, a computer network 100 for implementing the power management scheme includes a local area network (LAN) 192 and a plurality of computer systems 110, 120, . . . 170. LAN 192 provides a high speed data link between computer systems 110, 120, . . . 170. As is known to one skilled in the art, computer systems can be coupled to each other by a wide variety of networking topologies including high speed local buses, local area network (LAN) such as ethernet, and wide area network (WAN) such as asynchronous transfer mode (ATM), and combinations of the above. In this embodiment, computer systems 110, 120, . . . 170 are similar and hence the following description of computer system 110 is applicable to computer systems 120, . . . 170.

Figure 1B:
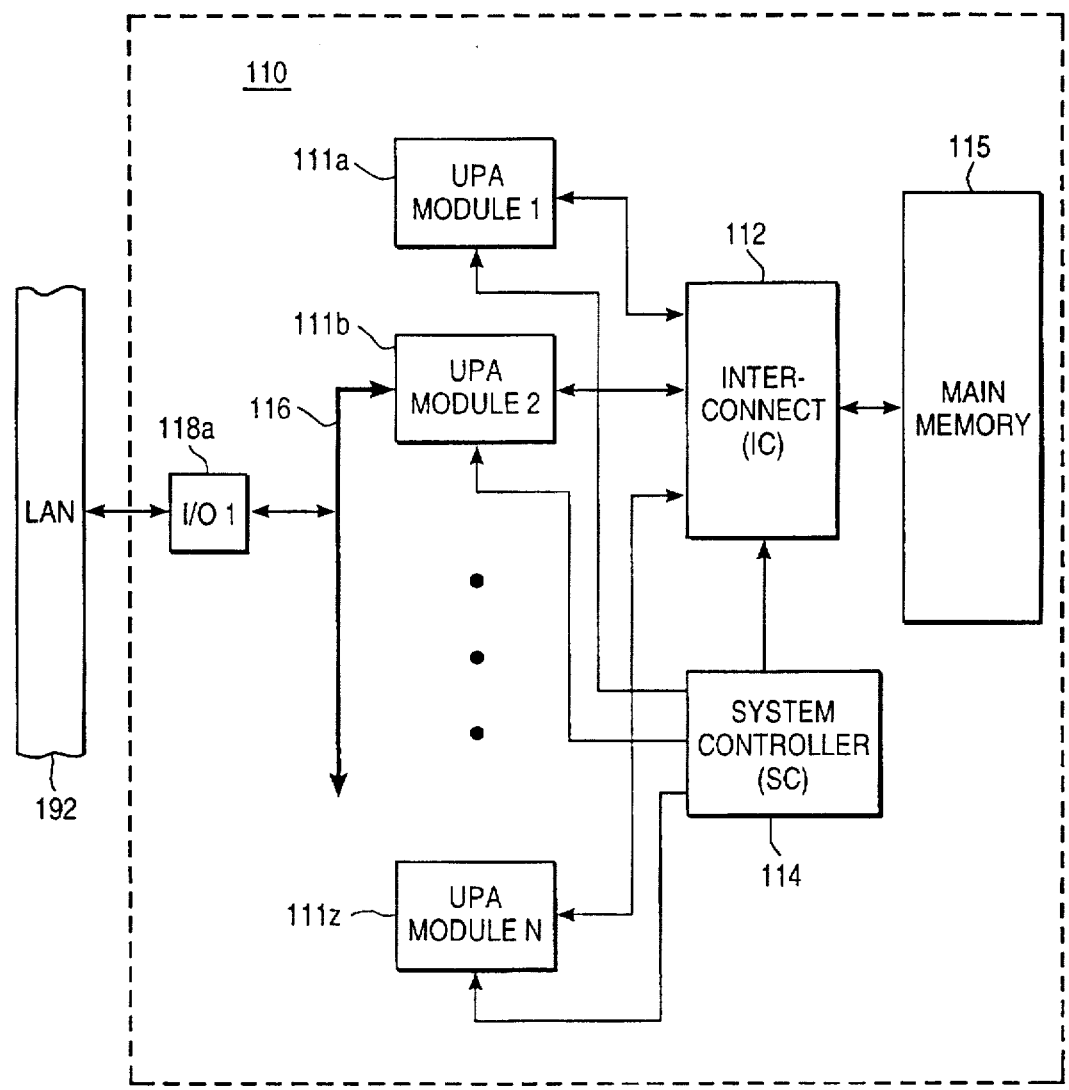
FIG. 1B shows one of the multi-module computer systems of FIG. 1A.

Referring now to FIG. 1B, computer system 110 includes a plurality of modules 111a, 111b, . . . 111z, an interconnect (IC) 112, a system controller (SC) 114 and a main memory 115. Modules 111a, 111 b, . . . 111z are individually coupled to interconnect 112. Main memory 115 is also coupled to interconnect 112. Control lines couple system controller 114 to each of modules 111a, 111b, . . . 111z, interconnect 112, and main memory 115. The plurality of modules 111a, 111b, . . . 111z includes one or more processor module(s) and one or more input/output (I/O) interface module(s). Co-pending patent application, entitled "Packet Switched Cache Coherent Multiprocessor System", U.S. patent application Ser. No. 08/415,175, filed Mar. 31, 1995, assigned to Sun Microsystems, Inc. provides a detailed description of this embodiment of computer system 110. In this example, module 111a is a processor module, module 111b is an I/O interface module, and module 111z is a graphics interface module. Module 111b is coupled to LAN 192 via an I/O bus 116 and an I/O controller 118a.

In this implementation, computer system 110 is a packet-switched and interconnect 112 is a datapath crossbar. Interconnect interfaces of modules 111a, 111b, ... 111z enable the modules to exchange data and control packets with each other via interconnect 112. Although computer system 110 is packet-switched, i.e., circuit-switched data lines are not required, the principles of the invention are also applicable to other non packet-switched systems. (For detailed information on cache management and data packet transfers by computer system 110 please refer to co-pending application co-pending patent application, entitled "Packet Switched Cache Coherent Multiprocessor System", U.S. patent application Ser. No. 08/415,175, filed Mar. 31, 1995, assigned to Sun Microsystems, Inc.

Figure 1C:
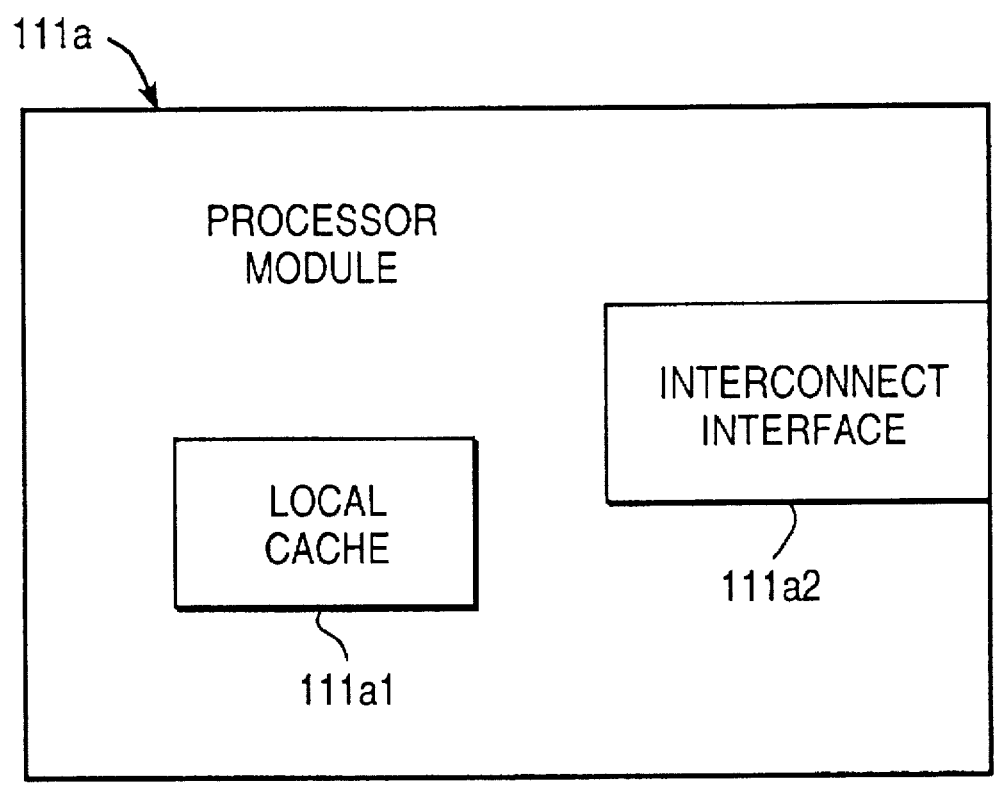
FIG. 1C, 1D and 1E illustrate exemplary modules, a processor module, an I/O interface module, and a graphics module, respectively, of the multi-module computer system of FIG. 1B.

FIG. 1C illustrates exemplary processor module 111a of computer system 110. Processor module 111a includes an interconnect interface 111a2 and an optional local cache memory 111a1. In this implementation, since the processor modules of computer network 100 are similar in structure, a description of the operation of processor module 111a is equally applicable to other processor modules of computer systems 110, 120, ... 170.

Figure 1D:
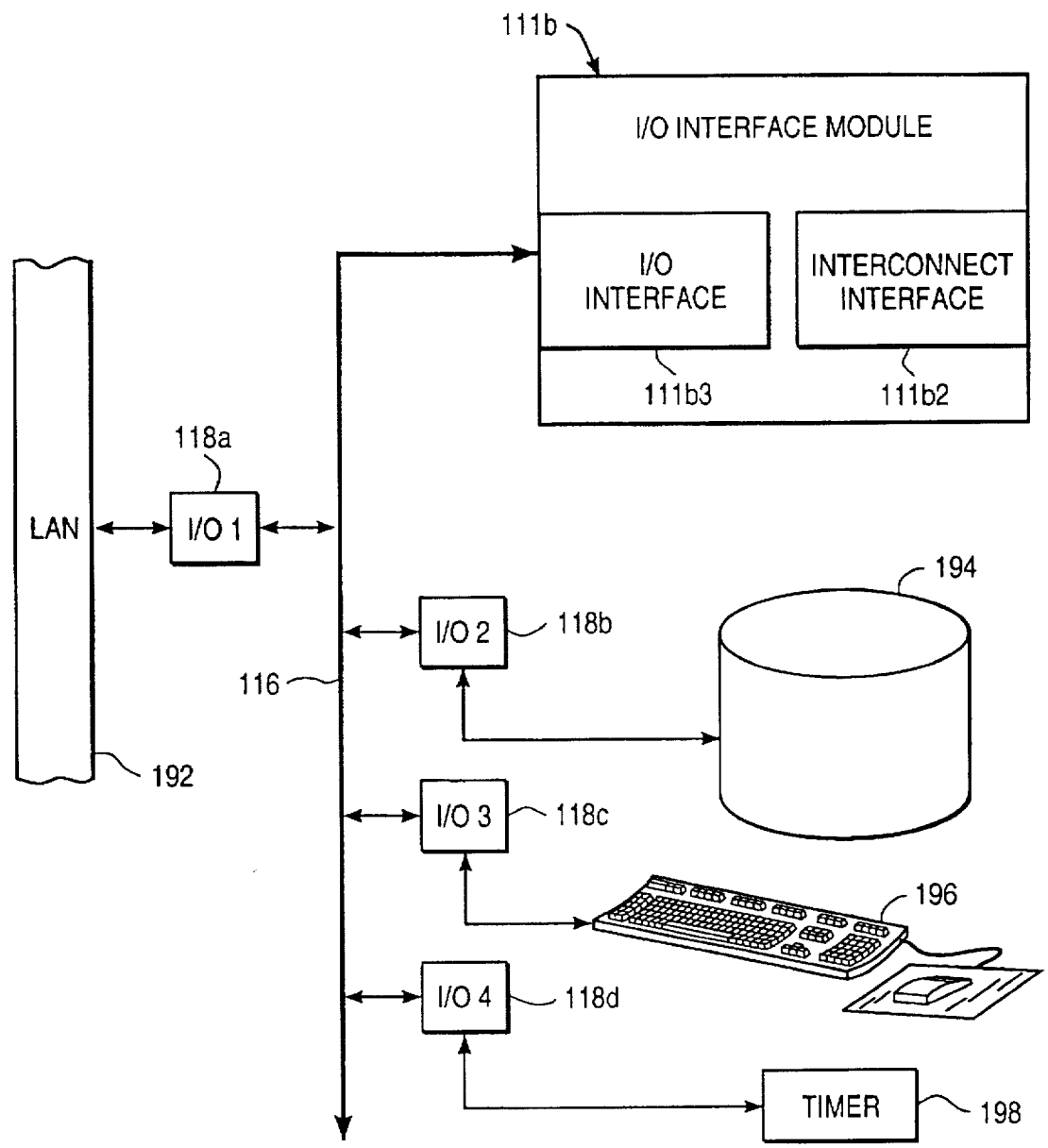

As shown in FIG. 1D, I/O bus 116 couples exemplary I/O interface module 111b to I/O controllers 118a, 118b, 118c, 118d of computer system 110. In turn, I/O controllers 118a, 118b, 118c, 118d provide interfaces for LAN 192, SCSI devices such as a hard disk drive 194, a keyboard 196 and an inactivity timer 198. Suitable system buses for implementing I/O bus 116 include the SBus and the PCI bus. Although computer system 110 is described as having one I/O interface module 111b, additional I/O interface modules can be added to computer system 110 for providing additional I/O capability, e.g., an ATM connection, an ISDN connection and a PCMCIA card.

Figure 1E:
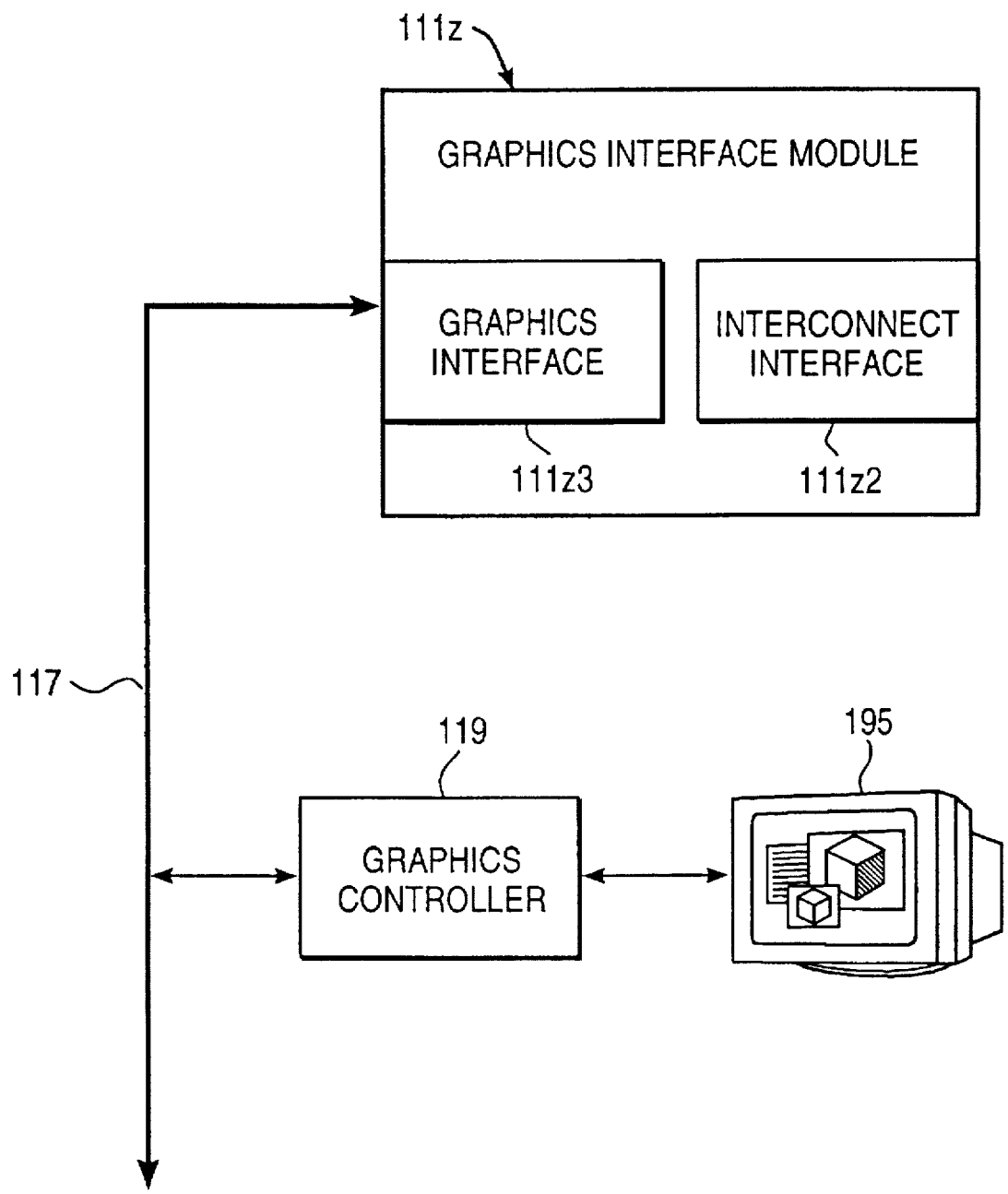

FIG. 1E shows exemplary graphics interface module 111z of computer system 110. Module 111z is coupled to a graphics display device 195 via graphics bus 117 and a graphics controller 119. Additional graphics controller(s) may be added for supporting additional graphics display devices. Graphics controller 119 may also control multiple graphics display devices.

The power management scheme for computer network 100 of the present invention provides processor modules of computer systems 110, 120, ... 170 the ability to transparently enter and leave the sleep state while LAN 192 remains powered-up, thereby permitting computer network 100 to remain fully operational while reducing overall power consumption. This is possible because the respective I/O interface modules of computer systems 110, 120, ... 170 remain powered-up while one or more processor modules and selected peripheral devices are powered down when computer network 100 enter the sleep state; the rationale being processor modules typically consume the most power, along with peripheral devices such as disk drives and display monitors.

In this implementation, while the processor modules may be powered-down independently, the powered-down modules are powered up by a single reset signal of computer system 110. In other implementations, separate reset signals can be used for powering up individual modules.

In accordance with one aspect of the invention, computer system 110 enters the sleep state under one of the following exemplary conditions. First, computer system 110 may enter the sleep state whenever it receives a time-out notification from inactivity timer 198. Various criteria can be used by inactivity timer 198, such as inactivity of keyboard 196 or inactivity of user process(es) executing on processor module 111a. Second, computer system 110 can enter the sleep state upon completion of specific tasks. For example, processor module 111a can initiate an entry by computer system 110 into the sleep state upon completion of a house-keeping chore such as a periodic memory backup or a chronological task such as user accounting for charge backs. Third, a network message may arrive at computer system 110 from a network manager via LAN 192 to computer system 110 initiating an entry into the sleep state. Fourth, a user at computer system 110 may initiate an entry of computer system 110 into the sleep state by depressing a standby power switch. Fifth, a brown-out/power-failure detector of computer system 110 may initiate an entry into the sleep state upon detecting an impeding shut-down of the primary power supply of computer system 110. Other conditions for entering the sleep state are possible since the topology of computer network 100, particularly computer system 110, advantageously permits both systems designers and end-users a great deal of flexibility in implementing different conditions for entering into the sleep state.

Figure 2:
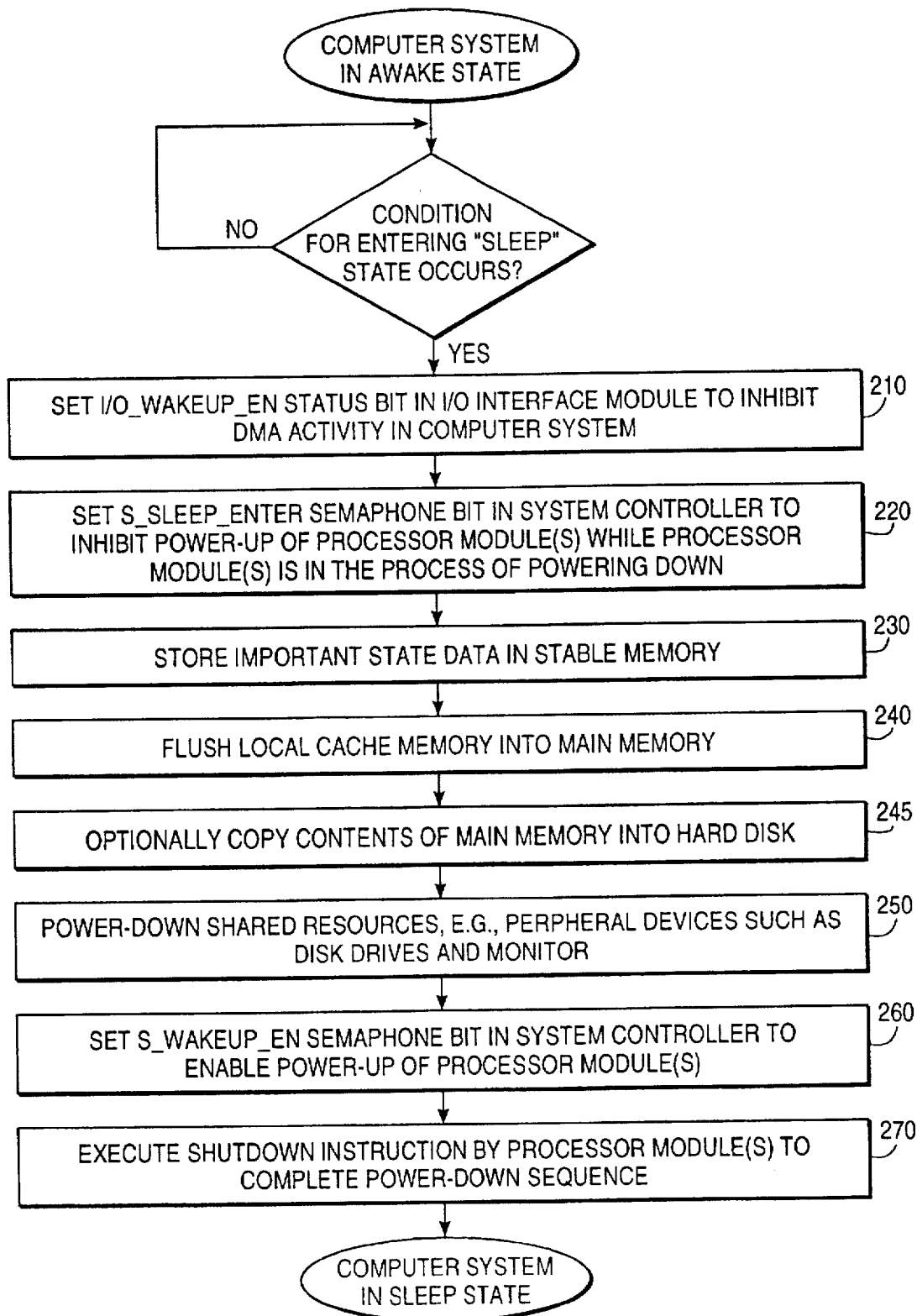
FIG. 2 is a flow diagram showing a transition of the computer system from an awake state into a sleep state.

FIG. 2 is a flow diagram illustrating steps executed by computer system 110 to enter the sleep state. First, processor module 111a sets an I/O_Wakeup_Enable status bit of I/O interface module 111b (step 210). When the I/O_Wakeup_Enable bit is set, all direct memory access (DMA) arbitration on the computer's system bus is inhibited, preventing any DMA to a potentially halted main memory 115. Consequently, any bus arbitration request for DMAs will trigger an interrupt request (Int_Req) for powering up processor module 111a. For example, a DMA request from I/O interface module 111b will result in an Int_Req to system controller 114 for powering up processor module 111a to process the DMA. Thereafter, until the I/O_Wakeup_Enable bit has been cleared, system controller 114 is responsible for policing traffic through interconnect 112 and for powering-up processor module 111a when the need arises.

Next, an S_Sleep_Enter semaphore bit of system controller 114 is set (step 220). Setting the S_Sleep_Enter bit ensures that processor module 111a can execute critical sections of the power down sequence without any power-up reset signals arriving at processor module 111a. The S_Sleep_Enter bit provides an indicator to system controller 114 that processor module 111a is in the process of being powered down and inhibits any attempt to power up processor module 111a until a second semaphore bit, the S_Wakeup_Enable bit, of system controller 114 is set by processor module 111a to indicate that module 111a has completed its power-down sequence and can now be powered-up. For a description of the configuration registers for implementing the sleep semaphores, and a description of the inhibition of interrupts and data packets see co-pending patent application, entitled "Packet Switched Cache Coherent Multiprocessor System", U.S. patent application Ser. No. 08/415,175, filed Mar. 31, 1995, assigned to Sun Microsystems, Inc.

Figure 1F:
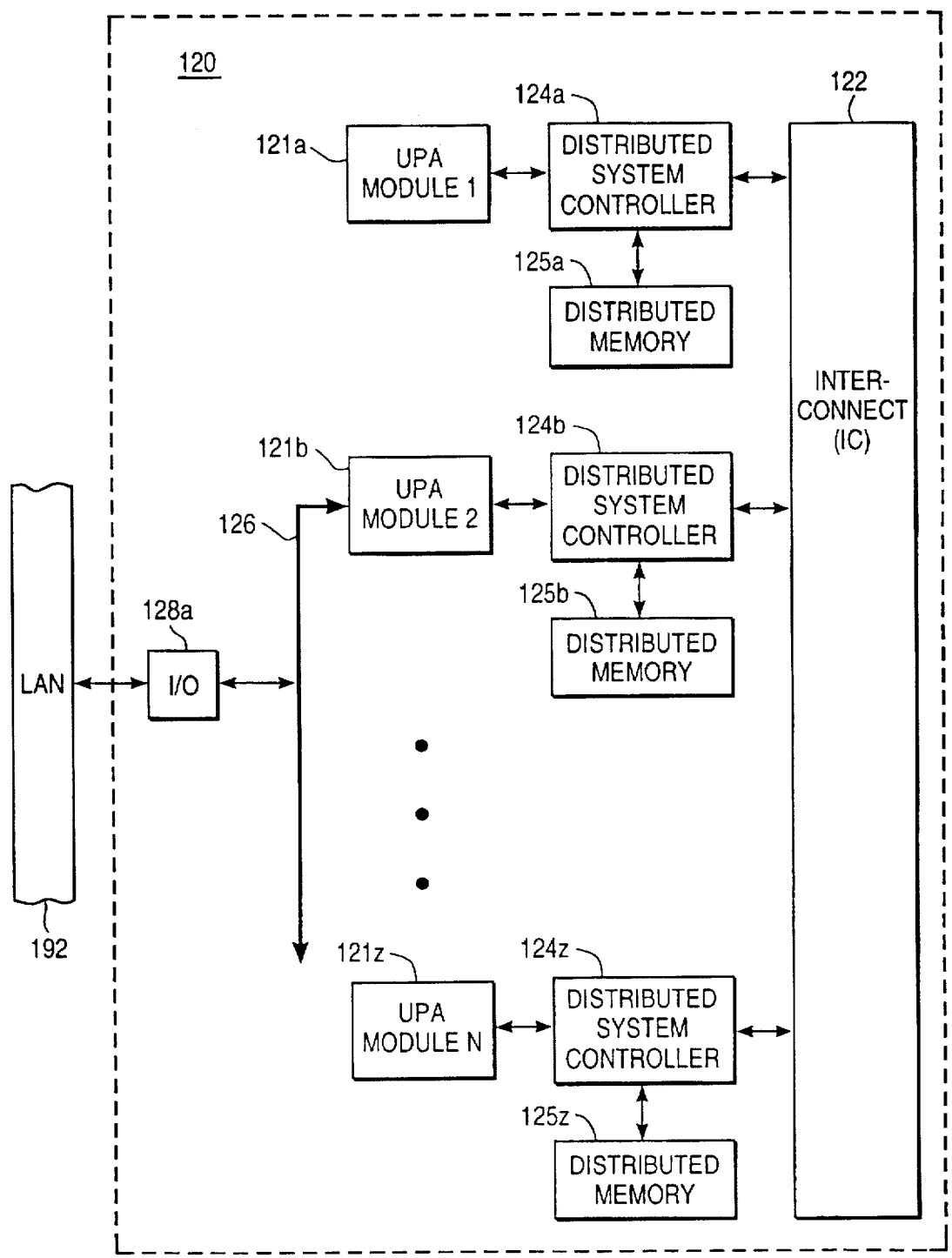
FIG. 1F shows another one of the multi-module computer systems of FIG. 1A.

Note that other implementations are possible. For example, as shown in FIG. 1F, in another embodiment of computer system 120, each module is coupled to a distributed system controller and a distributed memory. For example, module 121a is coupled to distributed system controller 124a and distributed memory 125a. As such, processor modules of modules 121a . . . 121z can be individually powered down, with a separate semaphore bit pair, i.e., S_Sleep_Enter and S_Wakeup_Enable bits, provided for each processor module.

Important state data of processor module 111a are then stored in stable memory, e.g., non-volatile memory (step 230). The contents of local cache memory 111a1 are flushed into main memory 115 (step 240). Optionally, the contents of main memory 115 can be copied onto hard drive 194 if powering down of the DRAMs in main memory 115 is supported (step 245).

In this embodiment, one processor module, processor module 111a, is responsible for initiating a power down of the shared resources of computer system 110, e.g., peripheral devices such as disk drive 194 and graphics display device 195 (step 250). For example, graphics controller 119 may halt the vertical/horizontal synchronization signals and blank the video signal to display device 195. Alternatively, display device 195 can be powered down.

At this stage, the second semaphore bit, the S_Wakeup_Enable bit, is set (step 260). Setting the S_Wakeup_Enable bit provides an indicator that processor 111a has completed its power-down sequence. System controller 114 can now generate a reset signal to power up processor module 111a.

Finally, a ShutDown instruction is executed by processor module 111a thereby completing the entry of computer system 110 into the sleep state (step 270). When a processor module, e.g., processor module 111a, is powered-down, the internal clock of processor module 111a is disabled in a manner consistent with the underlying semiconductor technology. For example, in CMOS technology, it is advantageous to be able to stop the internal processor clock to minimizing power consumption. In this embodiment, when processor module 111a is powered-down, the main system clock of computer system 110 remains running while the internal processor clock of processor module 111a is suppressed internally by processor module 111a.

In accordance with another aspect of the invention, when computer system 110 is in the sleep state, computer system 110 appears to be awake with respect to the other computer systems 120, . . . 170. This illusion is possible because system controller 114, interconnect 112 and I/O interface module 111b remain powered-up. By remaining powered-up, I/O interface module 111b is continuously ready to receive data packets from LAN 192. Hence, when a data packet arrives at I/O controller 118a from LAN 192, I/O interface module 111b generates an Int_Req for system controller 114, causing computer system 110 to enter the awake state.

In this implementation, data packets may be discarded at the network level, i.e., ignored by system controller 114. Although some network level packets may be lost, robust higher level protocols such as TCP may be capable of recovering from such a loss without losing the network connection, thereby providing end-to-end integrity of data packets transmitted by user applications executing on computer network 100. This advantageous aspect of the present invention provides computer systems 110, 120, . . . 170 with the illusion of appearing to be "awake" while actually in the sleep state. In other implementations, the incoming data packets are buffered at I/O interface module 111b until the intended recipient of the data packet, e.g., processor module 111a, has been powered up.

In accordance with another yet aspect of the invention, when computer system 110 is in the sleep state, computer system 110 can be awaken under pre-defined conditions called events. There are two classes of events; namely deterministic events and asynchronous events. Note the following definitions of deterministic and asynchronous events are provided to better illustrate the various events since the transition of computer system 110 from the sleep state into the awake state in response to different events are similar.

Deterministic events are events triggered internally by computer system 110. An example of a deterministic event is when computer system 110 needs to execute a housekeeping chore such as a daily back up of the contents of a hard drive onto magnetic tape, when an internal timer expires, e.g., at midnight. Such an event is deterministic because computer system 110 is the originator of the event and as such, controls the beginning and end of the housekeeping chore. Similarly, when processor module 111a is the "write-enabled" owner of a data structure whose most current copy is stored in local cache 111a1 of processor module 111a, and a second processor module of computer system 110 needs to read and then write over the data structure, such a read of the data structure initiated by the second processor module is also deterministic with respect to computer system 110.

Conversely, asynchronous events are events triggered by a source external to computer system 110. An example of an asynchronous event is the arrival of a network packet at network controller 118a and destined for a processor module of computer system 110. Another example of an asynchronous event is a user depressing a key on keyboard 196, or depressing a standby button of computer system 110.

Figure 3A:
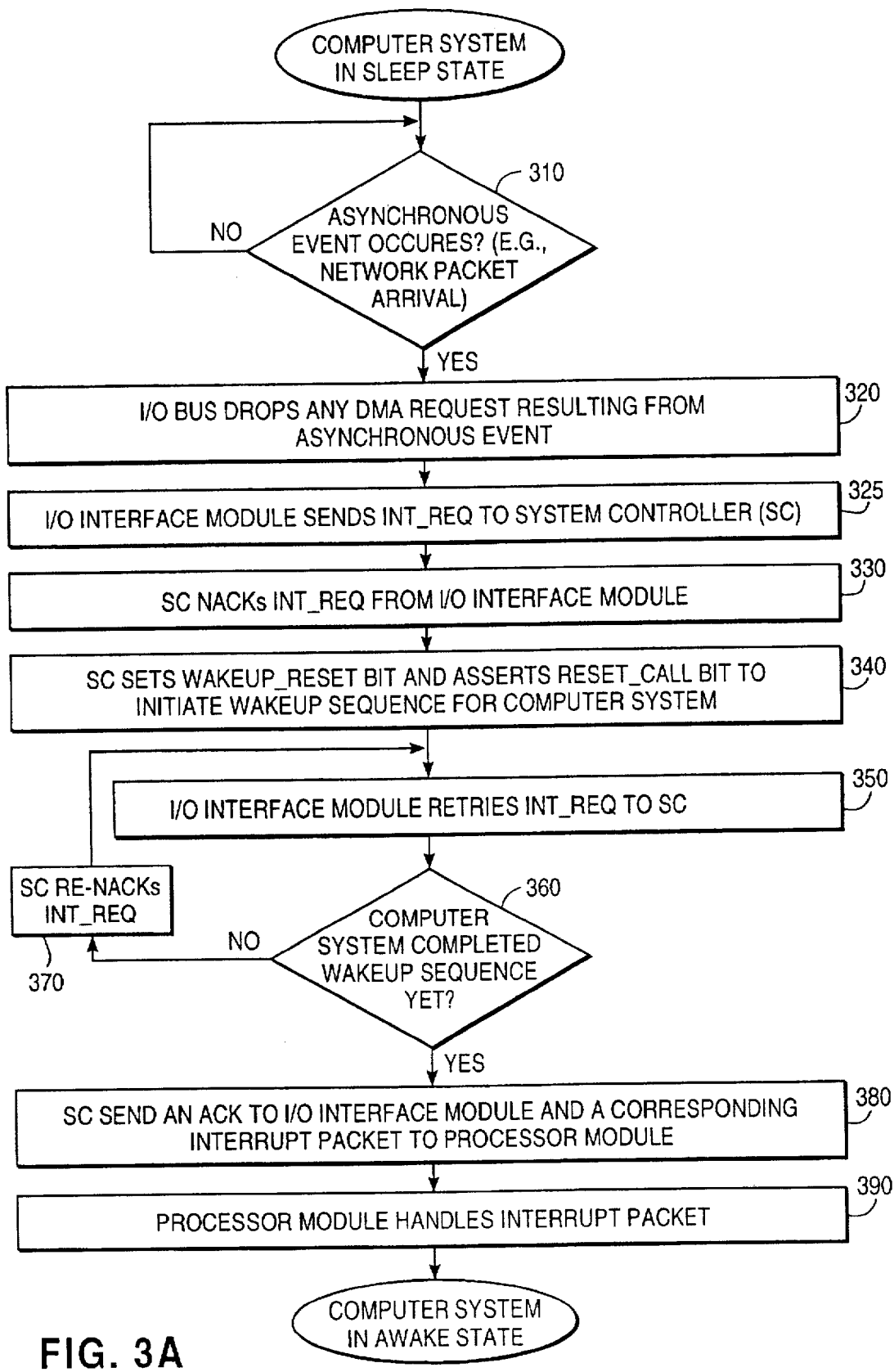
FIG. 3A and 3B are flow diagrams illustrating the processing of an asynchronous event and a deterministic event, respectively.
Figure 3B:
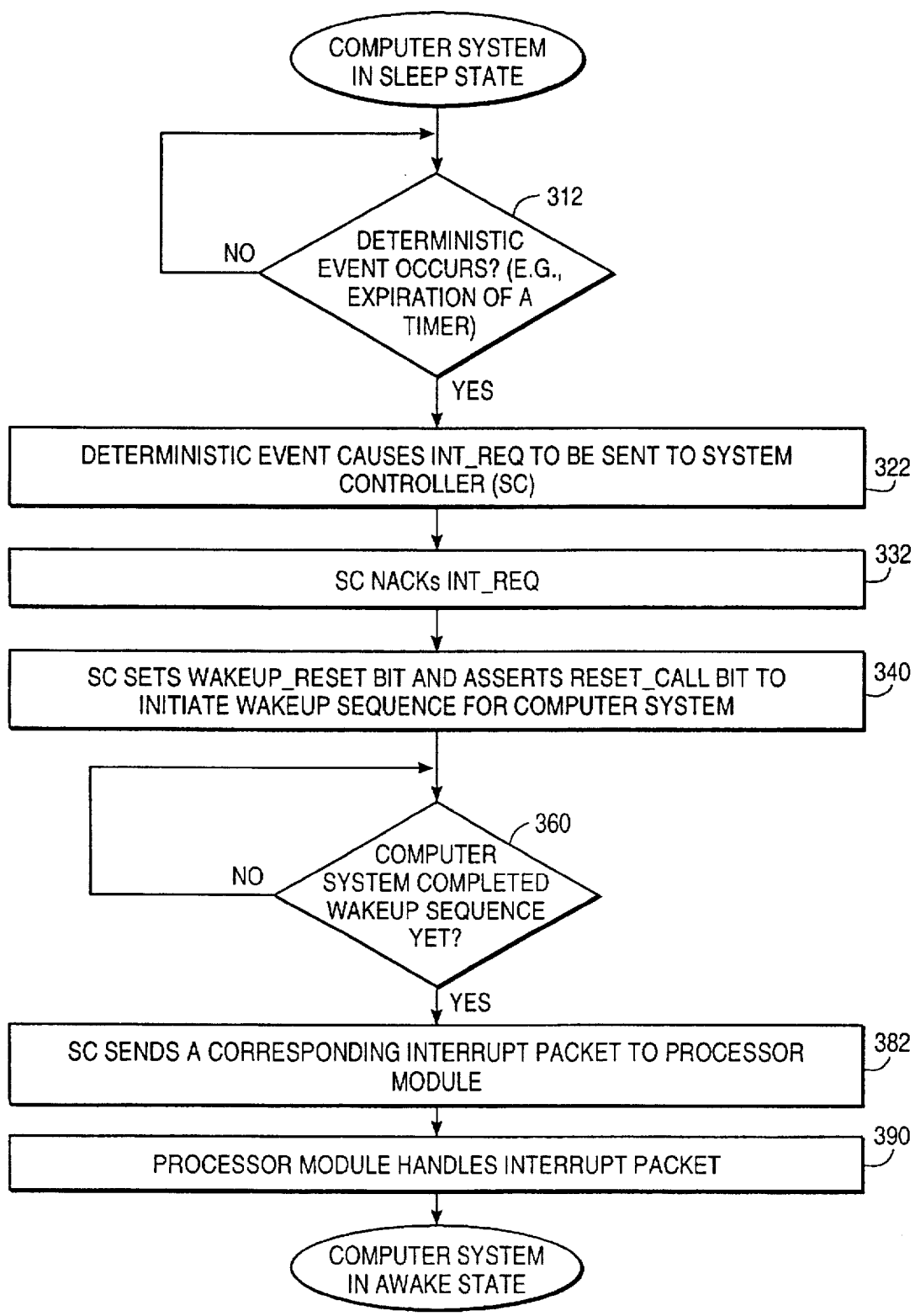
Figure 3C:
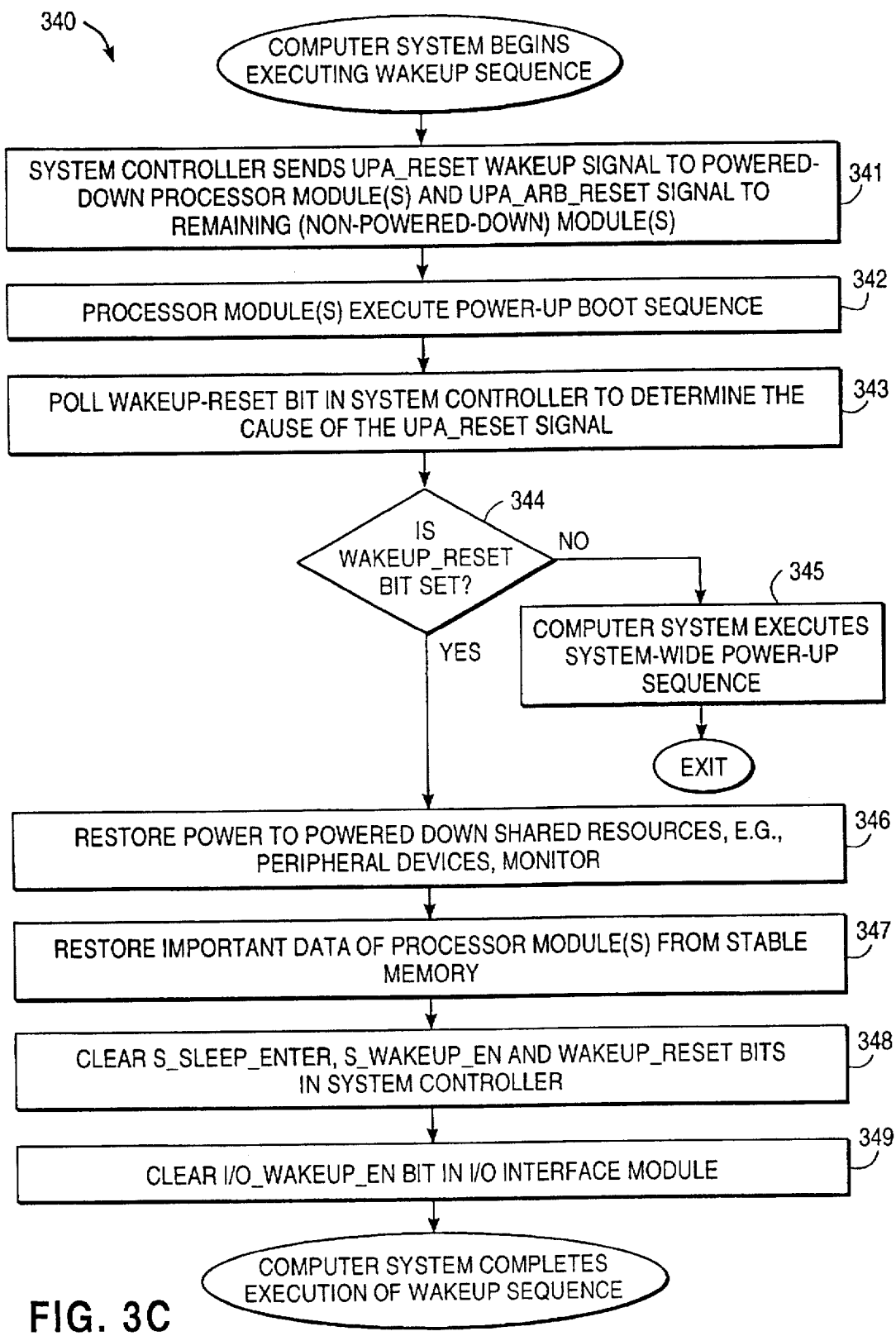
FIG. 3C is a flow diagram showing a transition the computer system from the sleep state into the awake state.
Figure 4:
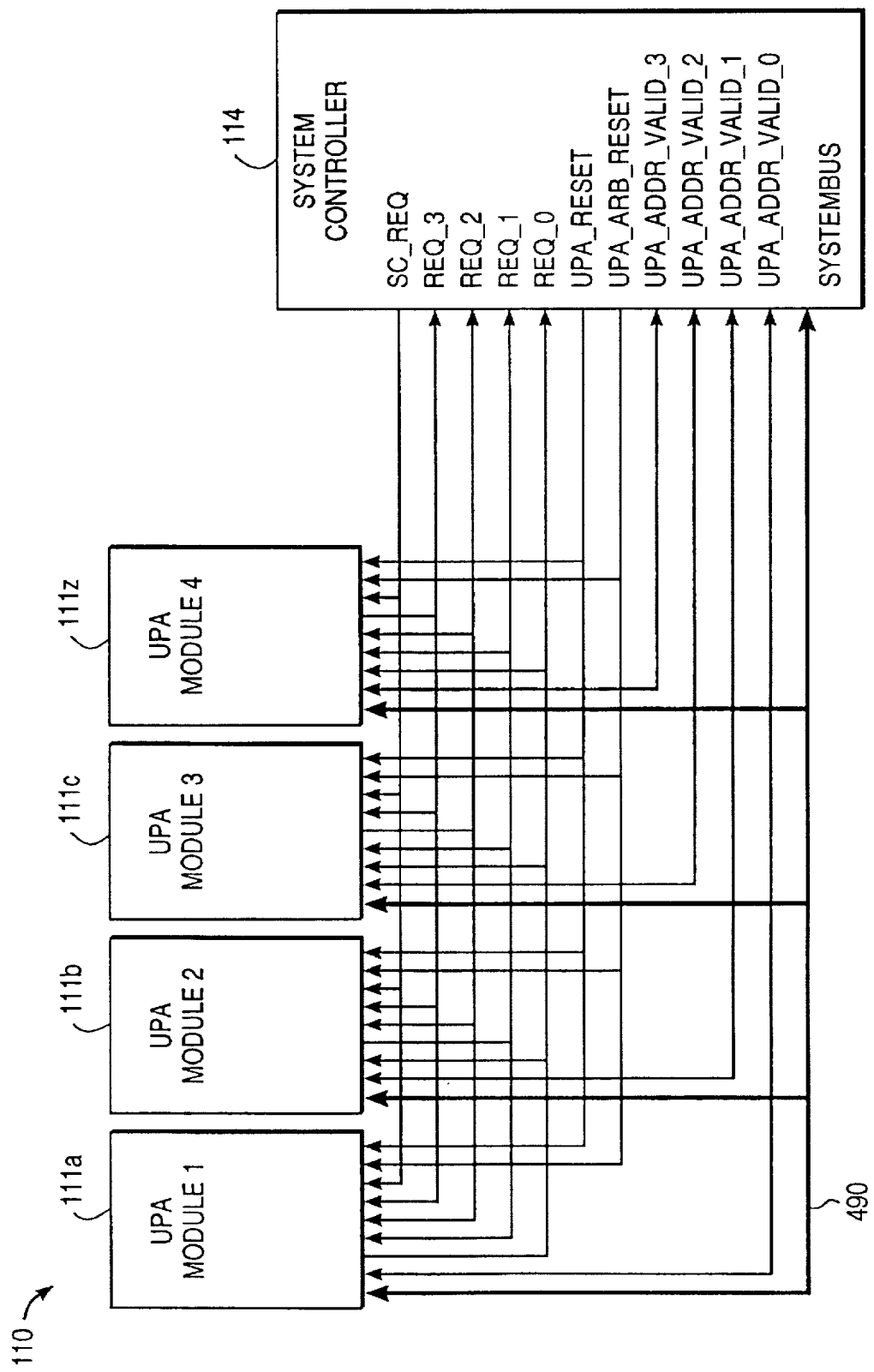
FIG. 4 is a block diagram of a four module computer system illustrating reset signals for powering up processor module(s) while preserving the states of the I/O interface module.

FIGS. 3A and 3B are flow diagrams illustrating the processing of an asynchronous event and a deterministic event, respectively. FIG. 3C is a flow diagram illustrating the wakeup sequence executed by computer system 110 to transition from the sleep state into the awake state. FIG. 4 shows an implementation of computer system 110 illustrating a pair of reset signals for waking up computer system 110. The reset signals power up any powered-down module(s) among modules 111a, 111c, . . . 111z while preserving the states of modules which remain powered-up, e.g., I/O interface module 111b. The two reset signals used by system controller 114 are the UPA_Reset and UPA_Arb_Reset signals; the UPA_Arb_Reset signal is provided to modules that are not powered down, e.g., I/O interface module 111b, while the UPA_Reset signal is provided to powered-down modules, e.g., processor module 111a and graphic module 111z. In other implementations, where only selected processor modules are powered down, the UPA_Arb_Reset signal is provided to processor module(s) that remain powered-up.

Referring now to FIG. 3A, when computer system 110 detects an asynchronous event, e.g., the arrival of a network packet at I/O bus 116 for powered-down processor module 111a (step 310), I/O bus 116 drops any DMA request resulting from the asynchronous event (step 320). A corresponding interrupt request (Int_Req) is generated by I/O interface module 111b for system controller (SC) 114 (step 325). System controller 114 NACKs (negative acknowledgment) the Int_Req from I/O interface module 111b (step 330). System controller 114 then sets the Wakeup_Reset bit and also asserts a Reset_Call bit to initiate a wakeup sequence for computer system 110 (step 340). Meanwhile, I/O interface module 111b keeps resending Int_Req to SC 114 (step 350). SC 114 responds by reNACKing (step 370) until computer system 110 has completed the wakeup sequence (step 360). In this implementation, the I/O_Wakeup_Enable bit is cleared to indicate that the processor module(s) of computer system 110 are now powered-up, e.g., processor module 111a is now powered up and is able process to the cause of the Int_Req. For a detailed description of the reset signals and the ACK/NACK protocol, see co-pending patent application, entitled "Packet Switched Cache Coherent Multiprocessor System", U.S. patent application Ser. No. 08/415,175, filed Mar. 31, 1995, assigned to Sun Microsystems, Inc.

Upon completion of the wakeup sequence, system controller 114 sends an ACK to I/O interface module 111b and a corresponding interrupt packet to processor module 111a (step 380). Processor module 111a is now powered-up and able to handle the interrupt packet from SC 114 (step 390). Computer system 110 is now in the awake state.

As shown in FIG. 3B, when computer system 110 detects a deterministic event, e.g., expiration of a timer, an Int_Req is generated for system controller 114 (step 322). System controller 114 NACKs the Int_Req (step 332). Next, system controller 114 sets the Wakeup_Reset bit, and also asserts the Reset_Call bit to initiates a wakeup sequence for computer system 110 (step 340). Upon completion of the wakeup sequence (step 360), system controller sends a corresponding interrupt packet to processor module 111a (step 382). Processor module 111a is powered-up and able to handle the interrupt packet, e.g., attend to the expiration of the timer (step 392). Computer system 110 is now in the awake state.

Referring now to FIG. 3C, the wakeup sequence of computer system 110 is described in greater detail. In this embodiment, reset signals are sent to processor module 111a in the following manner. First, system controller 114 asserts a request to become a master of system bus 490 (FIG.4). When system controller 114 is granted system bus 490, SC 114 asserts the UPA_Arb_Reset signal for powered-up module(s), and UPA_Reset signal for powered-down module(s), e.g., I/O interface module 111b and processor module 111a, respectively (step 341). The UPA_Arb_Reset signal allows the powered-up modules to synchronize their internal arbitration state(s) i.e., selectively clear arbitration state(s), without completely clearing all its internal states. System controller 114 holds the UPA_Arb_Reset signal low for the same duration as UPA_Reset signal. Note that before de-asserting the UPA_Arb_Reset signal, SC 114 de-asserts its request for system bus 490, and resets its own internal arbitration state to update the respective status bits of processor modules 111a, 111c.

Next, processor module 111a executes a power-up boot sequence (step 342). The boot sequence code is located in a suitable non-volatile memory such as in a boot PROM.

The Wakeup_Reset bit in system controller 114 is then polled to determine the cause of the reset signals (step 343). When a powered-down module of computer system 110, e.g., processor module 111a, is provided the UPA_Reset signal, module 111a is unaware of the origin or cause of the reset signal, i.e., whether the UPA_Reset signal was caused by a wakeup sequence or by a system-wide power-up sequence of computer system 110. Hence, if the Wakeup_Reset bit is not set, computer system 110 executes a system-wide power-up sequence (step 345). Conversely, if the Wakeup_Reset bit is set, computer system 110 proceed with the execution of the wakeup sequence.

Upon determining that the cause was a wakeup of computer system 110, power is restored to any powered-down shared resources such as peripheral devices (step 346). Important data is restored from the stable memory (step 347). Finally, the S_Sleep_Enter, S_Wakeup_Enable and Wakeup_Reset bits of system controller 114 are cleared (step 348), together with the I/O Wakeup_Enable control bit of I/O interface module 111b (step 349), thereby indicating that computer system 110 has completed its wakeup sequence. The order of clearing the control and semaphore bits is important so as to enable processor module 111a to distinguish between a power-up reset or a system-wide power-on reset. Computer system 110 is now in the awake state and processor module 111a is ready to process the cause of the event.

In some embodiments of computer system 110, addition states are provided, e.g., a "suspend" state, a "standby" state. The suspend state has a lower level of readiness than that of the sleep state. In the suspend state, computer system 110 is not network available, i.e., it appears to be sleeping with respect to the rest of computer network 100. The main power supply of computer system 110 is in a low power "standby" mode. A backup battery provides power to an alarm timer for waking computer system 110. Upon expiration of the alarm timer, the main power supply is re-enabled which wakes computer system 110 up. In addition, depressing a "power" key on keyboard 196 or a main on/off power switch also restarts computer system 110. The suspend state is useful for computer systems that need not be "network alive", i.e., appear awake all the time.

The standby state of computer system 110 has a readiness level between that of the sleep state and the awake state. In the standby state, all processor modules remain awake while inactive peripheral devices, e.g., disk drive(s) and display device(s) are turned off or enter a low power mode.

Other modifications and additions are possible without departing from the spirit of the invention. For example, the total number of processor modules within each computer system can be smaller or larger. In addition, the control functions provided by the system controller of each computer system can be distributed among the modules of each computer system. Other computer network configurations and hybrids of processor modules are also possible. For example, clusters of multi-module computer systems may be coupled to each other by a variety of means including high speed buses. It is also possible for some processor modules to remain continuously powered up, and/or for some I/O interface modules which only control passive devices such as magnetic tape drives and laser disk drives to be powered down. Hence the scope of the invention should be determined by the following claims.

What is claimed is:

1. A method for managing power in a computer network having a plurality of computer systems and a network connection means, each said computer system including a processor module, an input/output (I/O) interface module and a main memory, each said I/O interface module coupled to the network connection means, the method comprising the steps of:

setting an indicator corresponding to a first said processor module of a first computer system to indicate a power down of the first processor module corresponding to a transition of the first computer system from an awake state into a sleep state;

storing data including state information of the first processor module in a first said main memory of the first computer system;

powering down the first processor module while a first said I/O interface module of the first computer system remains powered up, thereby reducing the power consumption of the computer network;

detecting an asynchronous event initiated by a source external to the first computer system; and responding to the detection of the asynchronous event by:
  powering up the first processor module and performing a wake-up sequence in the processor module;
  generating, within the first computer system, an interrupt request corresponding to the asynchronous event and regenerating the interrupt request until a positive acknowledgement of the interrupt request is generated; and
  responding to each interrupt request corresponding to the asynchronous event by (A) generating a negative acknowledgment of the interrupt request if the first processor module has not completed the wake-up sequence, and (B) generating a positive acknowledgement of the interrupt request and sending to the first processor module an interrupt packet corresponding to the asynchronous event if the first processor module has completed the wake-up sequence.

2. The method of claim 1, wherein
the powering down step includes performing a powering down sequence, wherein a beginning portion of the powering down sequence includes setting a Sleep Entered status bit and an ending portion of the powering down sequence includes setting a Wakeup Enable bit;
at completion of the wake-up sequence of the first processor module, clearing the Sleep Entered status bit and the Wakeup Enabled bit;
wherein whenever the Sleep Entered bit is set and the Wakeup Enable bit is clear, powering up of the first processor module is inhibited until the powering down sequence is completed.

3. The method of claim 1, wherein the step of performing a wake-up sequence includes:
  executing a boot sequence with the first processor module; and
  restoring data including the state information of the first processor module from the first main memory.

4. The method of claim 3 wherein the asynchronous event is a network packet arriving at the first I/O interface module.

5. The method of claim 1 further comprising the step of sending an arbitration reset signal to the first I/O interface module which selectively resets an arbitration state of the first I/O interface module.

6. A computer system comprising:
  a processor module, including means for executing a power down sequence and for executing a wake-up sequence;
  an input/output (I/O) interface module coupled to a network connection means for receiving network packets and detecting asynchronous events initiated by sources external to the computer system;
  a main memory for storing data including state information of the processor module; and
  a system controller coupled to the I/O interface module and the processor module;
  the power down sequence including storing data including state information of the processor module in the main memory and powering down the processor module while the I/O interface module remains powered up;
  the I/O interface module including means for responding to detection of the asynchronous event by sending an interrupt request to the system controller, and for regenerating the interrupt request until a positive acknowledgment of the interrupt request is received;
  the system controller including means for responding to a first interrupt request corresponding to the asynchronous event by causing the processor module to power up and start executing the wake-up sequence, and for responding to each interrupt request corresponding to the asynchronous event by (A) sending the I/O interface module a negative acknowledgment of the interrupt request if the processor module has not completed the wake-up sequence, and (B) generating a positive acknowledgement of the interrupt request and sending to the processor module an interrupt packet corresponding to the asynchronous event if the processor module has completed the wake-up sequence.

7. The computer system of claim 6 wherein
the system controller's means for responding to the first interrupt request includes means for setting a Sleep Entered status bit, and the system controller's means for responding to each interrupt request when the processor module has completed the wake-up sequence includes clearing the Sleep Entered status bit;
the power down sequence including setting a Wakeup Enabled bit at an ending portion of the powering down sequence;
the wake-up sequence includes clearing the Wakeup Enabled bit at completion of the wake-up sequence;
wherein whenever the Sleep Entered bit is set and the Wakeup Enabled bit is clear, powering up of the processor module is inhibited until the powering down sequence is completed.

8. The computer system of claim 7 wherein the wake-up sequence includes:
  executing a boot sequence with the processor module; and
  restoring data including the state information of the processor module from the main memory.

9. The computer system of claim 8 wherein the asynchronous event is a network packet arriving at the I/O interface module.

10. A method for managing power in a computer network having a plurality of computer systems and a network connection means, each said computer system including a processor module, an input/output (I/O) interface module and a main memory, each I/O interface module coupled to the network connection means, the method comprising the steps of:
  performing a powering down sequence in a first one of the computer systems to transition the first computer system from an awake state into a sleep state, including:
    storing data including state information of the first processor module in a first said main memory of the first computer system; and
    powering down the first processor module while a first said I/O interface module of the first computer system remains powered up, thereby reducing the power consumption of the computer network;
  detecting an asynchronous event initiated by a source external to the first computer system; and
  responding to the detection of the asynchronous event by:
    powering up the first processor module and performing a wake-up sequence in the first processor module;
    generating, within the first computer system, an internal interrupt request corresponding to the asynchronous event and regenerating the interrupt request whenever a negative acknowledgment of the interrupt request is generated; and responding to each interrupt request corresponding to the asynchronous event by (A) generating a negative acknowledgment of the interrupt request if the first processor module has not completed the wake-up sequence, and (B) generating a positive acknowledgment of the interrupt request and sending to the first processor module an interrupt packet corresponding to the asynchronous event if the first processor module has completed the wake-up sequence.

11. The method of claim 10, wherein the powering down step includes performing a powering down sequence, wherein a beginning portion of the powering down sequence includes setting a Sleep Entered status bit and an ending portion of the powering down sequence includes setting a Wakeup Enabled bit;

at completion of the wake-up sequence of the first processor module, clearing the Sleep Entered status bit and the Wakeup Enabled bit;

wherein whenever the Sleep Entered bit is set and the Wakeup Enabled bit is clear, powering up of the first processor module is inhibited until the powering down sequence is completed.

12. The method of claim 10, the step of performing a wake-up sequence including:

executing a boot sequence with the first processor module; and restoring data including the state information of the first processor module from the first main memory.

13. The method of claim 10, wherein the asynchronous event is a network packet arriving at the first I/O interface module.

14. A computer system comprising:

a processor module, including means for executing a power down sequence and for executing a wake-up sequence;

an input/output (I/O) interface module coupled to a network connection means for receiving network packets and detecting asynchronous events initiated by sources external to the computer system;

a main memory for storing data including state information of the processor module; and a system controller coupled to the I/O interface module and the processor module;

the power down sequence including storing data including state information of the processor module in the main memory and powering down the processor module while the I/O interface module remains powered up;

the I/O interface module including means for responding to detection of an asynchronous event by sending an interrupt request to the system controller, and for regenerating the interrupt request whenever a negative acknowledgment of the interrupt request is received;

the system controller including means for responding to a first interrupt request corresponding to the asynchronous event by causing the processor module to power up and start executing the wake-up sequence, and for responding to each interrupt request corresponding to the asynchronous event by (A) sending the I/O interface module a negative acknowledgment of the interrupt request if the processor module has not completed the wake-up sequence, and (B) generating a positive acknowledgment of the interrupt request and sending to the processor module an interrupt packet corresponding to the asynchronous event if the processor module has completed the wake-up sequence.

15. The computer system of claim 14, wherein:

the system controller's means for responding to the first interrupt request includes means for setting a Sleep Entered status bit, and the system controller's means for responding to each interrupt request when the processor module has completed the wake-up sequence includes clearing the Sleep Entered status bit;

the power down sequence includes setting a Wakeup Enabled bit at an ending portion of the powering down sequence;

the wake-up sequence includes clearing the Wakeup Enabled bit at completion of the wake-up sequence;

wherein whenever the Sleep Entered bit is set and the Wakeup Enabled bit is clear, powering up of the processor module is inhibited until the powering down sequence is completed.

16. The computer system of claim 14, wherein the wake-up sequence includes:

executing a boot sequence with the processor module; and restoring data including the state information of the processor module from the main memory.

17. The computer system of claim 14 wherein the asynchronous event is a network packet arriving at the I/O interface module.

* * * * *